United States Patent
Kim (12) United States Patent (10) Patent No.: US 7,318,020 B1
Kim (45) Date of Patent: Jan. 8, 2008

(54) METHODS AND SYSTEMS FOR EXTERNAL LOCALIZATION

(75) Inventor: Kim Kim, W. University Place, VA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 10/681,451

(22) Filed: Oct. 8, 2003

(51) Int. Cl.
*G10L 15/00* (2006.01)
(52) U.S. Cl. .............................. 704/2; 704/4
(58) Field of Classification Search ............. 704/2, 704/4
See application file for complete search history.

(56) References Cited

U.S. PATENT DOCUMENTS

| | | | |
|---|---|---|---|
| 5,499,335 A | 3/1996 | Silver et al. ............... 395/161 |
| 5,678,039 A | 10/1997 | Hinks et al. | |
| 6,035,121 A | 3/2000 | Chin et al. | |
| 6,092,036 A | 7/2000 | Hamann et al. | |
| 6,453,462 B1 | 9/2002 | Meade et al. | |
| 6,496,793 B1 | 12/2002 | Veditz et al. | |
| 6,507,813 B2 | 1/2003 | Veditz et al. | |
| 7,024,365 B1* | 4/2006 | Koff et al. ............... 704/270.1 |
| 7,103,875 B1* | 9/2006 | Kaneko et al. ............. 717/125 |
| 2003/0182632 A1* | 9/2003 | Murdock et al. ........... 715/536 |

OTHER PUBLICATIONS

Eurocity Software—Software Translator—FAQ sheet (date prior to Oct. 2003).

* cited by examiner

*Primary Examiner*—Daniel Abebe
(74) *Attorney, Agent, or Firm*—Merchant & Gould P.C.

(57) ABSTRACT

Embodiments of the present invention relate to methods, systems and computer-readable media for external localization of a software product. This external localization comprises loading a base product having one or more calls to an operating system to load language specific data. A language specific localized product is generated, during loading of the base product, by converting the base product to a localized product using and at least one language map containing language specific data. The localized product is then executed in place of the base product.

19 Claims, 6 Drawing Sheets

METHODS AND SYSTEMS FOR EXTERNAL LOCALIZATION

TECHNICAL FIELD

The invention relates generally to the field of computer software products. More particularly, the invention relates to methods and systems for producing localized, language specific versions of a software product.

BACKGROUND OF THE INVENTION

Software products of all types, whether operating systems or various types of application programs, are frequently provided in multiple "localized", language specific versions. For instance, a software product may initially be developed in a specific language such as English. Once this original product has been developed and tested, localized versions, in a language appropriate to the market for which the product is intended, may be developed. For example, a product originally developed in English in the United States may be localized to produce a Japanese language version for sale in Japan. The process of creating a localized version is herein referred to as "localization."

A common method of localization, is known as internal localization. Internal localization typically involves changing or re-coding the source code of the original software product to produce the localized version. For example, all of the elements of the user interface, messages, help information, and other language specific parts of the software product are translated and re-coded.

However, since the source code of the software product is revised and recompiled, testing is required for each internally localized version generated, in addition to the base product, must be tested. Further, testing must be done even for very minor revisions like changing spelling or correcting typographical errors since even such minor revisions require the source code to be recompiled. Since testing is labor intensive, this method can be extremely expensive. In addition to being expensive, internal localization, due to the long time required to test a software product, results in a very slow delivery of localized versions of software products.

Another approach to providing a localized version of a software product has involved providing translation at a display or rendering level. That is, a base product in one, common language is developed, tested and distributed. A display level translation layer is distributed to provide a localized version of the product. The display level translation layer is executed along with the base product. Whenever the base product renders or displays any text, in the language of the base product, the rendering is intercepted and translated to the local language.

However, such a translation layer at the display level not efficient. For example, this translation layer uses a significant amount of system resources since it is constantly translating all messages and user interface elements. Additionally, the display level translation layer cannot accurately translate runtime messages. That is, messages or information such as error messages that are generated at runtime are difficult to handle using a display level translation layer since the messages are dynamically composed at runtime and corresponding translations may not be available. It is with respect to these considerations and others that the present invention has been made.

SUMMARY OF THE INVENTION

In accordance with the present invention, the above and other problems are solved by a system and method for load time external localization. Load time external localization uses a translation layer that, while a base software product is loaded, inserts language specific data into language specific portions of the base product to convert it to a localized product specific to the locale for which the localized product is intended.

In accordance with still other aspects, the present invention relates to a method of external localization of a software product. The method comprises loading a base product having one or more calls to an operating system to load language specific data. A language specific localized product is generated, during loading of the base product, by converting the base product to a localized product using and at least one language map containing language specific data. The localized product is then executed in place of the base product.

In accordance with other aspects, the present invention relates to a system for external localization of a software product. The system has a processor and a memory coupled with and readable by the processor. The memory contains a series of instructions that, when executed by the processor, cause the processor to load a base product having one or more calls to an operating system to load language specific data, generate, during the loading of the base product, a language specific localized product by converting the base product to the localized product using at least one language map containing language specific data, and execute the localized product in place of the base product.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
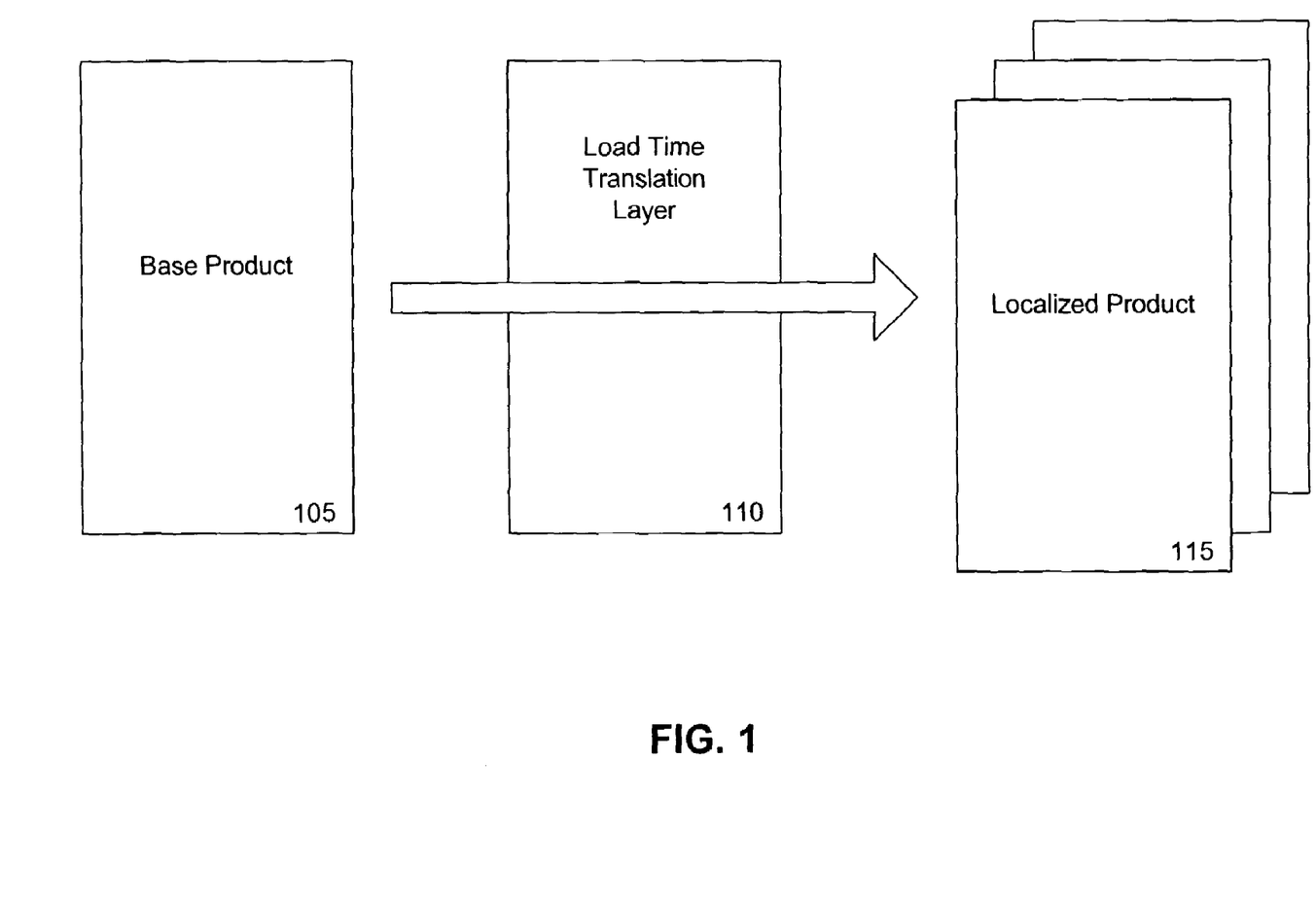
FIG. 1 illustrates, conceptually, external localization according to one embodiment of the present invention.

FIG. 1 illustrates, conceptually, external localization according to one embodiment of the present invention. This example includes a base product 105, a load time translation layer 110, and one or more localized products 115. The base product 105 represents any of a wide variety of possible software products including but not limited to a word processor, spreadsheet, Internet browser, database, operating system, and others. The base product may be developed for a specific language. For example, a product developed in the United States may be developed in English. Alternatively, the base product may be language neutral. That is, the base product may be developed in such a manner as to have no reference in its user interface or other elements written to a specific language. In other cases, the base product may be written with only minimal reference to a specific language to facilitate testing of the base product during development. Therefore, in one embodiment, the base product 105 may not be fully functional without the localization provided by load time localization layer 110. In other embodiments the base product 105 may be functional, even without localization by the load time translation layer 110.

The load time translation layer 110, also referred to as the external translation layer, will execute upon loading or start-up of the base product 105 as will be described in detail below. Generally speaking, the load time translation layer inserts language specific data into language specific portions of the base product to convert it to a localized product 115 specific to the locale for which the localized product is intended. For example, if the localized product is intended for Germany, the translation layer 110, when the base product is loaded, will insert German language data into the base product to convert it to a German localized product.

The language specific localized product 115, converted by the load time translation layer 110 while the base product 105 is being loaded, is therefore made up of the base product 105 with data specific to the local language for which the localized product is intended. That is, the translation layer 110 inserts language specific data into portions of the base product 105 such as the user interface or other portions that use a specific language to convert the base product 105 to a localized product 115.

Therefore, by externally replacing data in the base product 105 with local language data when the application is loaded, revisions and recompilation of the base product 105 are not needed and additional testing can be avoided. Additionally, as will be seen below, multiple languages may be used on one system by changing the language specific data used by the translation layer. So, if more than one set of language specific data is available to the translation layer 110, more than one localized product 115 may be generated for a system by using a different set of language specific data as required without changes to the base product 105.

Figure 2:
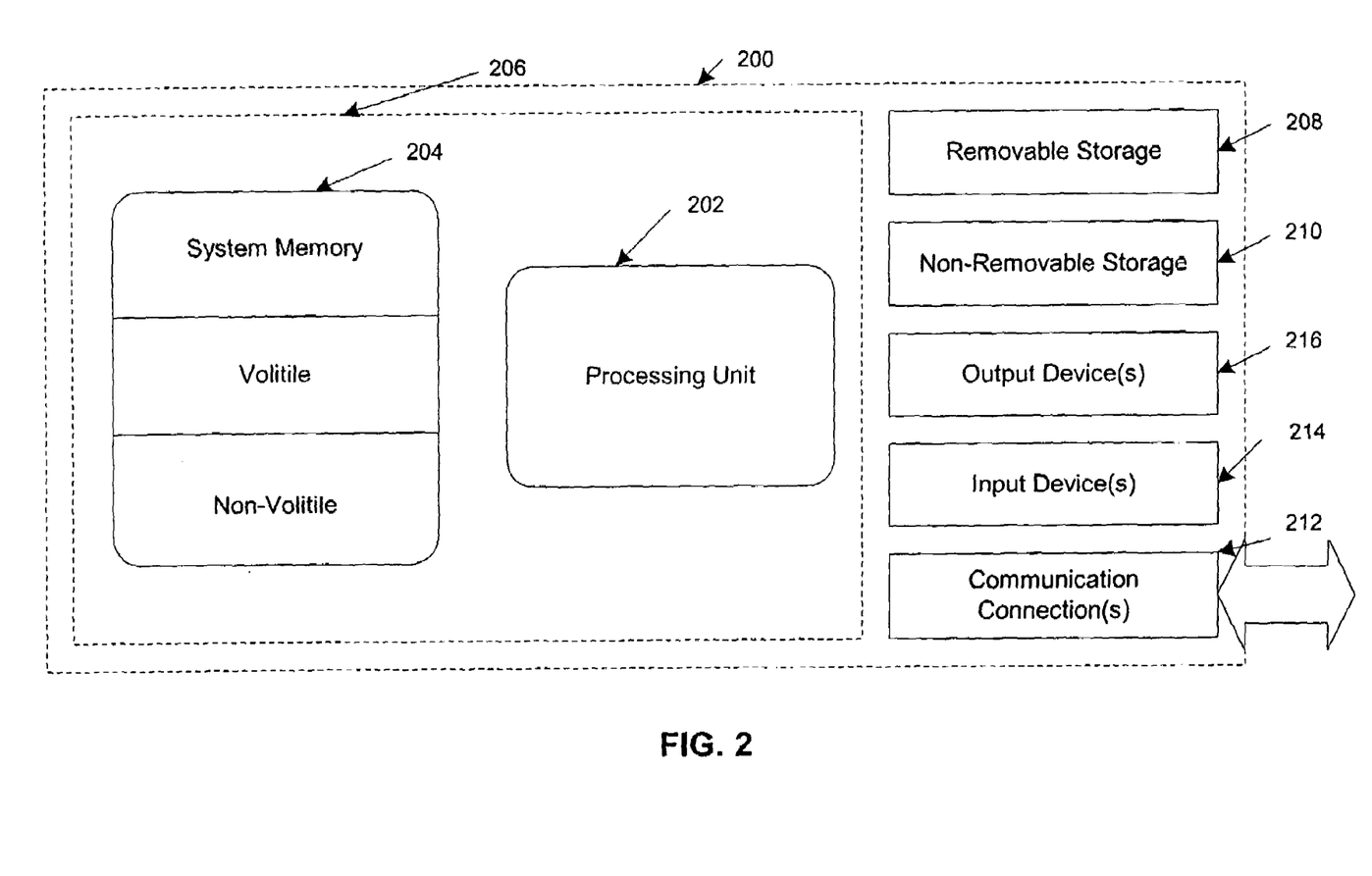
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as a redirector and/or servers in a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
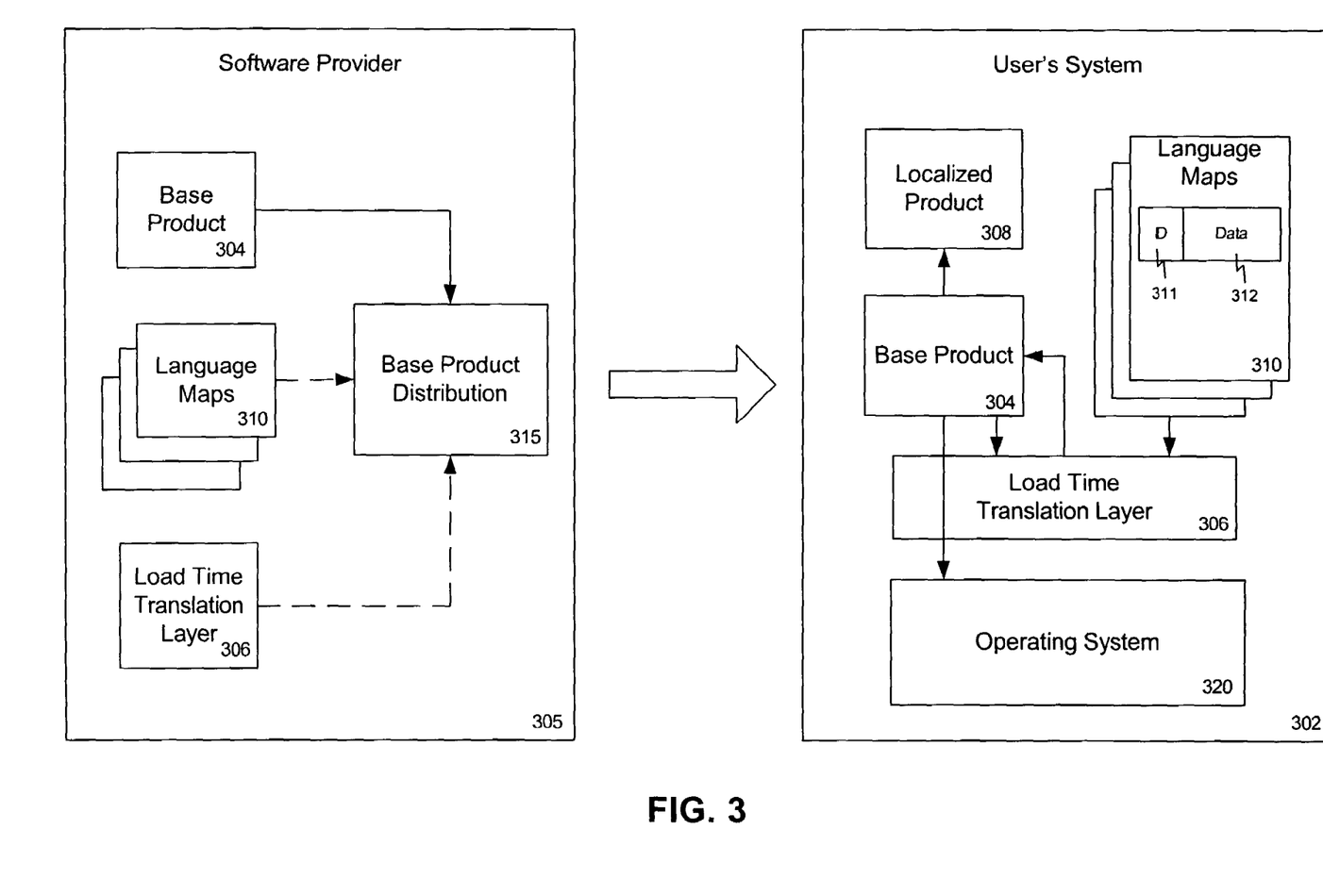
FIG. 3 illustrates at a high level the main functional components of a system for supplying and executing a software product utilizing external localization according to one embodiment of the present invention.

FIG. 3 illustrates at a high level the main functional components of a system for creating, supplying, and executing a software product utilizing external localization according to one embodiment of the present invention. This example includes a software provider system 305 and a user's system 302 wherein the user's system 302 in one embodiment relates to a computer system such as system 200 described above. Generally speaking, the software provider 305 generates a base product distribution 315 that is supplied to a user who installs the base product 304 on the user's system 302 wherein the base product 304 is an example of base product 105 shown and discussed above.

The base product distribution 315 includes at least the base product 304. The base product 304 is developed and tested by the software supplier 305 as any software product normally would be. However, the base product 304 may be developed for a specific language, may be language neutral, or may be written with only minimal reference to a specific language to facilitate testing of the base product during development. As will be discussed below, the base product 304 includes one or more calls to an operating system of the user's system 302 such as Application Program Interface (API) calls. These calls allow external, language specific data to be inserted into the base product 304 when it is loaded on the user's system 302.

One or more language maps 310 may also be included in the base product distribution 315. The language maps 310 include the external, language specific data that is inserted into the base product 304 to produce a localized product 308. Each language map 310 contain data, as a string or in another format, in a particular language, representing elements of the base product's user interface, text for messages, text for help information, and all other language specific text for the base product. In some cases, rather than being distributed with the base product 304 in the base product distribution 315 the language maps 310 may be distributed separately. For example, language maps 310 may be distributed individually or as part of an operating system.

The base product distribution 315 may also include a load time translation layer 306 which will be activated if a language map is available and configured accordingly. The load time translation layer is one embodiment of load time translation layer 110 shown and described above with reference to FIG. 1. The load time translation layer 306, when installed on the user's system 302, detects system calls for language specific data made by the base product 304 when it is loaded. That is, the load time translation layer 306 is a program that operates in conjunction with the base product 304 when the base product 304 is loaded to convert the base product 304 to the localized product 308. The load time translation layer 306, as will be discussed below, inserts the language specific data from the language maps 310 into the base product 304 to produce a localized product 308. Rather than being distributed as part of the base product distribution 315, the load time translation layer 306 may be distributed separately or with one or more language maps 310. Alternatively, the load time translation layer 306 may be distributed as part of an operating system 320 executed on the user's system 302.

The user's system 302, once the base product 304, load time translation layer 306 and one or more language maps 310 are installed, produces a localized product 308 whenever the base product 304 is loaded. Generally, the base product 304, as mentioned above, includes one or more calls to the operating system 320 such as API calls. During loading or starting the base product 304, calls are made by the base product 304 specific to loading language data such as strings. The load time translation layer 306 will intercept these calls and return language specific data from the appropriate language map 310.

The load time translation layer 306 returns the language specific data from the language map 310. The language specific data from the language maps 310 is then combined with information from the base product 304 by the load time translation layer 306 to convert the base product 304 to the localized product 308 which is then executed on the user's system 302.

More specifically, the language maps 310 may comprise one or more entries with each entry comprises an identifier 311 and data 312 such as a string, and/or the source and target language pair. The base product 304, containing strings and identifiers for elements of the user interface or other language specific elements, may reference the appropriate data stored in the language map 310 using the identifier 311. Alternatively, the base product may use the actual string to get the translation of it from the data 312 in the language map 310 without the need for the identifier 311.

The data 312 stored in each entry of the language map 310 as strings or in another format may represent the language specific portions of a user interface, messages, etc. In some cases, the data, represented as a string, may include placeholders or arguments for portions of the string to be generated at runtime of the localized product 308. For example, a "%1 not found from %2" message, where %1 indicates the placeholder for a filename, and %2, the location, may be generated at runtime. The string stored in the language map 310 may be represented as "%2 from %1 found not" in, for example, Korean or whatever the local language equivalent would be. The localized product 308 may then use string replacement or concatenation at runtime to replace the placeholders (%1, %2) with the appropriate filename and the location, respectively. Use of such placeholders for runtime generated strings allows the language specific strings to provide correct localized text even for dynamically generated messages.

In some cases, the user's system 302 may use more than one language map 310. For example, a bilingual user may wish to have an English language map as well as a Spanish language map. This user may then select the user interface language as part of a set-up process before loading or starting the base product. The selection of a language may be stored in a registry or other persistent memory to be used by the load time translation layer 306 each time a base product 304 is loaded.

According to one embodiment of the present invention, the language maps 310 may also be used by the operating system 320 to generate a localized version of itself. That is, the language maps 310 may be used by the operating system 320 to convert a language specific user interface. More specifically, the operating system 320 may be distributed as a base product. Upon loading or startup of the operating system 320, the kernel and other portions of the operating system 320 that do not depend upon a specific language are loaded. Prior to loading the user interface portion of the operating system 320, the external load time translation layer 306 is started. Then, in loading the user interface, the load time translation layer 306 intercepts system calls relating to the user interface portion of the operating system for loading language specific data. The load time translation layer 306 inserts the language specific data from the language maps 310 into the user interface portions of the operating system 320 to convert the base product to a localized version of the operating system.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
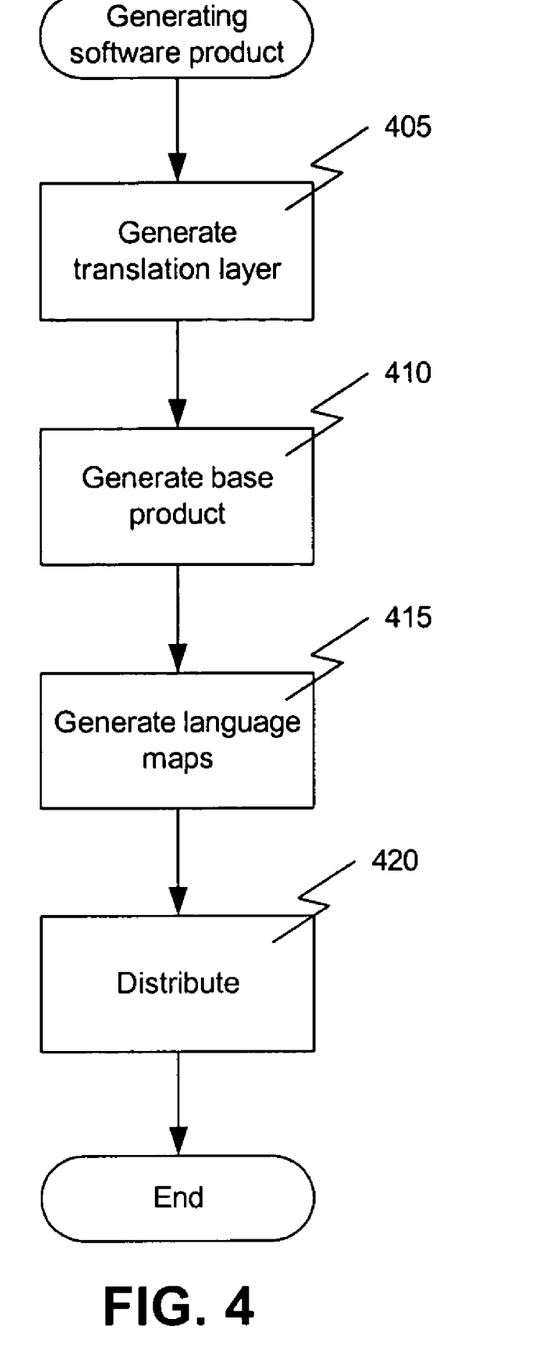
FIG. 4 is a flowchart illustrating generating a software product utilizing external localization according to one embodiment of the present invention.

FIG. 4 is a flowchart illustrating generating a software product utilizing external localization according to one embodiment of the present invention. In this example, operation begins with generate operation 405. Generate operation 405 comprises generating a translation layer. In some cases, the supplier of the base product may be different from the supplier of the operating system. In such a case, the supplier of the base product may use the translation layer supplied with the operating system. However, if the supplier of the base product also supplies the translation layer, the translation layer, as introduced above will, upon loading the base product, perform external localization of the base product by adding external, language specific data to the base product to form a localized product.

More specifically, generate operation 405 comprises generating the executable code that performs the functions of intercepting calls to the operating system from the base product to load language specific data, retrieving language specific data from the language map based on the calls to the operating system, and inserting the language specific data into the base product to convert the base product to the localized product. In order to generate such a layer, the developer identifies which calls will be made to the operating system to load language specific data. Similarly, the developer of the translation layer identifies the format of these calls and any associated parameters. Once these calls are known, the generation of the translation layer is fairly straight forward in that the developer creates executable code that can intercept the calls, evaluate the content or parameters of the calls, and elect to substitute data from the language maps for the calls. Next, the developer establishes the language map interface to read or lookup the correct data from the language map.

Next, at generate operation 410, a base product will be generated. The base product may be written for a specific language, may be language neutral, or may contain just enough reference to a specific language to allow for testing of the base product during development. However, the base product will be written with calls to an operating system specific to loading data for a particular language. These system calls, made when the base product is being loaded on a user's system, reference data in the language map.

More specifically, generate operation 410 comprises generating the executable code that performs the functions of the base product, whether it is a word processor, spreadsheet, graphics program, other application program or even an operating system. In generating this code, the developer identifies language specific portions of the code such as user interface elements. In these portions, the developer will make calls to an operating system specific to loading data for a particular language rather than hard-coding strings or other data to represent the language. For example, rather than hard-coding a string representing text to be displayed on a menu, a system call is made that will cause the load time translation layer to retrieve the text from the language map. For example, the LoadString call that is a part of the Microsoft Windows API may be used to retrieve strings. Similarly, the LoadLibrary call may be used to load a Dynamic Link Library (DLL).

Generate operation 415 comprises generating one or more language maps. Each language map contains language specific data such as strings for a given language. Each entry in the language map may contain an identifier and data, and/or the source and target language pair. The identifier provides a manner in which the base product may reference the data. Alternatively, the base product may use the actual source string to look up its translation from the language map or other conventional means. The data in each entry of the language map contains the language specific portions of a user interface, messages, etc. In some cases, the data, in the form of a string, may include placeholders or arguments for portions of the string to be composed at runtime of the localized product.

Finally, at distribute operation 420, the base product is distributed. Optionally, the base product may be distributed along with the translation layer and/or one or more language maps. Alternatively, the translation layer and/or one or more language maps may be distributed together or individually.

As may be appreciated, the base product distribution generated by a software provider need not contain the language maps and translation layer. That is, these elements are distinct and can therefore be distributed separately, as part of an operating system, or bundled together with the base product.

Figure 5:
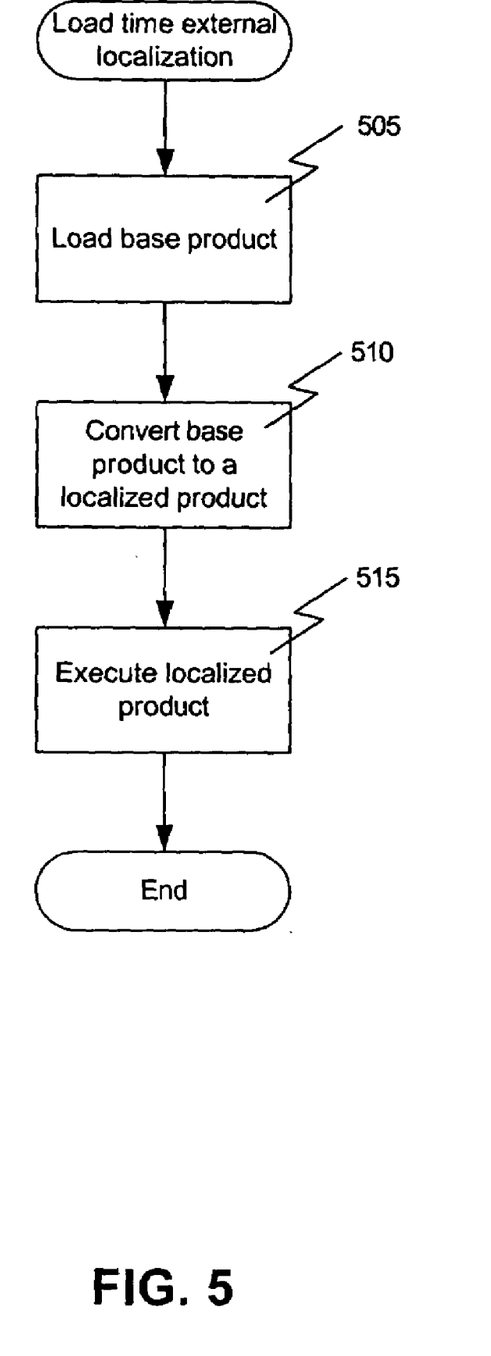
FIG. 5 is a flowchart illustrating load time external localization according to one embodiment of the present invention.

FIG. 5 is a flowchart illustrating load time external localization according to one embodiment of the present invention. In this example, operation begins with load operation 505. Load operation 505 comprises loading the base product. That is, the base product containing references to the language specific data in the language map as discussed above is started or loaded on the user's system thereby initiating the external localization. Once loading of the base product has started, control then passes to conversion operation 510.

Conversion operation 510 converts the base product to a language specific localized product, during loading of the base product, using the base product and the language map. Details of the conversion of a base product to a localized product will be discussed below with reference to FIG. 6. Generally, the localized product will consist of the base product with the language specific data from the language map added or inserted based on the references to that data in the base product. Then, at execute operation 515 the localized product is executed instead of the base product.

Figure 6:
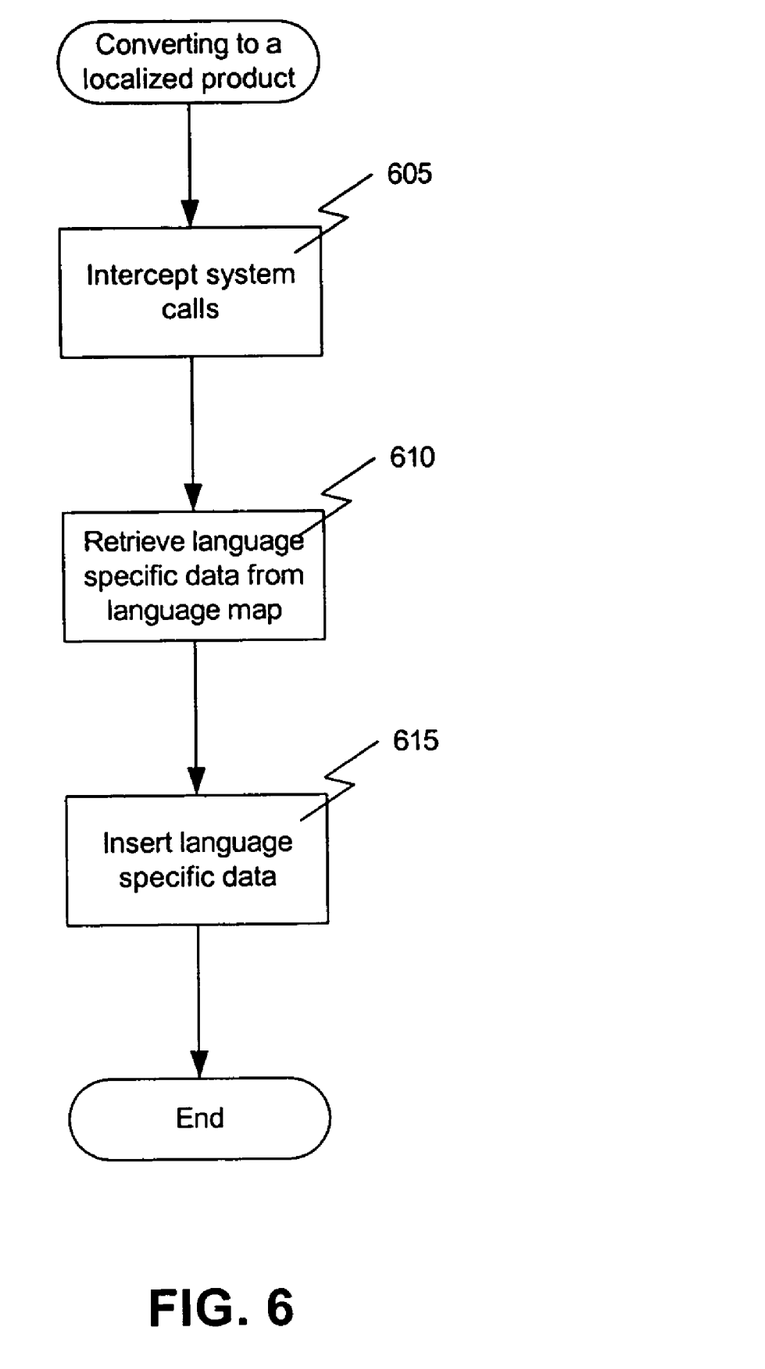
FIG. 6 is a flowchart illustrating converting the base product to a localized product according to one embodiment of the present invention.

FIG. 6 is a flowchart illustrating generating a localized product according to one embodiment of the present invention. In this example, operation begins with intercept operation 605. Intercept operation 605 comprises intercepting or detecting system calls from the base product as the base product is loaded. As mentioned above, the base product contains one or more system calls to an operating system on the user's system. The system calls specific to loading language data are intercepted. Interception may be performed, for example, by using the Shimming mechanism, which allows the interception of APIs before they are called and gives the ability to perform corrective actions either before, after or instead of the API call. Other similar functions available in other environments may also be used like Detour or Injector, etc.

Next, at retrieve operation 610 the language specific data indicated by the intercepted system calls is retrieved from the language map. As indicated above, the base product references specific data in the language map. This data is retrieved from the language map. Retrieval may be accomplished using the functions discussed above, other similar functions in different environments, or by other means such as performing a search of the language map. Control then passes to insert operation 615.

Insert operation 615 comprises inserting the language specific data retrieved from the language map into the base product to form the localized product. According to one embodiment of the present invention, inserting the language specific data to the base product may comprise adding a language mapping file to the base product. Inserting data into the base product may be accomplished using the Shimming technology discussed above, or other similar functions common to other environments may also be used.

Although the invention has been described in language specific to computer structural features, methodological acts and by computer readable media, it is to be understood that the invention defined in the appended claims is not necessarily limited to the specific structures, acts or media described. As an example, other types of data may be included in the language map in place of the string data discussed herein. Additionally, different manners of referencing the language specific data of the language map from the system calls in base product may be used. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of external localization of a software product comprising:
    loading a base product having one or more calls to an operating system to load language specific data;
    converting the base product to a language specific localized product during the loading of the base product using the base product and at least one language map containing language specific data, wherein the language specific data comprises string data that includes one or more placeholders for runtime generated strings; and
    executing the localized product in place of the base product.

2. The method of claim 1, wherein converting the base product to a language specific localized product comprises:
    intercepting the one or more calls to the operating system to load language specific data;
    retrieving language specific data from the language map based on the one or more calls to the operating system; and
    inserting the language specific data into the base product to produce the localized product.

3. The method of claim 1, wherein the one or more calls to an operating system to load language specific data reference the language specific data in the language map.

4. The method of claim 1, wherein the base product is language neutral.

5. A system comprising:
    a processor; and
    a memory coupled with and readable by the processor and containing a series of instructions that, when executed by the processor, cause the processor to load a base product having one or more calls to an operating system to load language specific data, convert the base product to a language specific localized product during the loading of the base product using the base product and at least one language map containing language specific data, and execute the localized product in place of the base product, wherein the language specific data in the language map comprises string data that includes one or more placeholders for runtime generated strings.

6. The system of claim 5, wherein converting the base product to a language specific localized product comprises:
    intercepting the one or more calls to the operating system to load language specific data;
    retrieving language specific data from the language map based on the one or more calls to the operating system; and
    inserting the language specific data into the base product to produce the localized product.

7. The system of claim 5, wherein the one or more calls to an operating system to load language specific data reference the language specific data in the language map.

8. The system of claim 5, wherein the base product is language neutral.

9. A computer readable medium encoding a computer program of instructions for executing a computer process for external localization, said computer process comprising:
    loading a base product having one or more calls to an operating system to load language specific data;
    converting the base product to a language specific localized product during the loading of the base product using the base product and at least one language map containing language specific data, wherein the language specific data comprises string data that includes one or more placeholders for runtime generated strings; and
    executing the localized product in place of the base product.

10. The computer readable medium of claim 9, wherein converting the base product to a localized product comprises:
    intercepting the one or more calls to the operating system to load language specific data;
    retrieving language specific data from the language map based on the one or more calls to the operating system; and
    inserting the language specific data into the base product to produce the localized product.

11. The computer readable medium of claim 9, wherein the one or more calls to an operating system to load language specific data reference the language specific data in the language map.

12. The computer readable medium of claim 9, wherein the base product is language neutral.

13. A method of generating a software product comprising:
    generating a base product comprising computer executable instructions including one or more calls to an operating system to load language specific data; and
    generating at least one language map for storing the language specific data, wherein the language specific data in the language map comprises string data that includes one or more placeholders for runtime generated strings.

14. The method of claim 13, further comprising generating a translation layer, the translation layer to intercept the one or more calls to the operating system to load language specific data, retrieve language specific data from the language map based on the one or more calls to the operating system, and insert the language specific data into the base product to convert the base product to a localized product.

15. The method of claim 14, further comprising distributing the translation layer as part of an operating system.

16. The method of claim 13, wherein the one or more calls to an operating system to load language specific data reference the language specific data in the language map.

17. A computer readable medium encoding a computer program of instructions for executing a computer process for external localization, said computer program comprising:
    a base product comprising computer executable instructions including one or more calls to an operating system to load language specific data; and
    at least one language map for storing the language specific data, wherein the language specific data in the language map comprises string data that includes one or more placeholders for runtime generated strings.

18. The computer readable medium of claim 17, further comprising a translation layer, the translation layer to inter cept the one or more calls to the operating system to load language specific data, retrieve language specific data from the language map based on the one or more calls to the operating system, and insert the language specific data into the base product to convert the base product to a localized product.

19. The computer readable medium of claim 17, wherein the one or more calls to an operating system to load language specific data reference the language specific data in the language map.

* * * * *